(12) United States Patent
Ziegler et al.

(10) Patent No.: US 10,508,690 B2
(45) Date of Patent: Dec. 17, 2019

(54) ROLLING-ELEMENT BEARING ASSEMBLY

(71) Applicant: Aktiebolaget SKF, Gothenburg (SE)

(72) Inventors: Sebastian Ziegler, Bamberg (DE);
Armin Olschewski, Schweinfurt (DE);
Thomas Peuschel,
Schonungen/Marksteinach (DE);
Alexander de Vries, Tiel (NL);
Andreas Clemens van der Ham,
Utrecht (NL)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/973,894

(22) Filed: May 8, 2018

(65) Prior Publication Data

US 2018/0340575 A1 Nov. 29, 2018

(30) Foreign Application Priority Data

May 24, 2017 (DE) .................. 10 2017 208 871

(51) Int. Cl.
*F16C 41/00* (2006.01)
*F16C 19/36* (2006.01)
*F16C 33/34* (2006.01)
*F16C 19/52* (2006.01)

(52) U.S. Cl.
CPC ............ *F16C 41/007* (2013.01); *F16C 19/36* (2013.01); *F16C 19/52* (2013.01); *F16C 33/34* (2013.01); *F16C 41/008* (2013.01); *F16C 2233/00* (2013.01)

(58) Field of Classification Search
CPC ........................... F16C 41/007; F16C 2233/00
See application file for complete search history.

(56) References Cited

U.S. PATENT DOCUMENTS

| 5,181,423 | A * | 1/1993 | Philipps | G01D 5/2417 |
| | | | | 340/448 |
| 8,376,622 | B2 * | 2/2013 | Claus | F16C 19/52 |
| | | | | 384/448 |
| 8,961,021 | B2 * | 2/2015 | Stubenrauch | F16C 41/008 |
| | | | | 384/448 |
| 9,127,649 | B2 * | 9/2015 | Matsuda | F16C 41/008 |
| 9,816,896 | B2 * | 11/2017 | Meaney | F16C 41/00 |

(Continued)

FOREIGN PATENT DOCUMENTS

| EP | 908714 A1 * | 4/1999 | |
| EP | 2746610 B1 * | 11/2016 | ............ F16C 41/008 |
| WO | WO-2015032445 A1 * | 3/2015 | ............ G01M 13/04 |

*Primary Examiner* — Thomas R Hannon
(74) *Attorney, Agent, or Firm* — Garcia-Zamor Intellectual Property Law, LLC; Ruy Garcia-Zamor; Bryan Peckjian

(57) ABSTRACT

A rolling-element bearing assembly includes first and second rolled-on surface elements and a plurality of rolling elements arranged therebetween such that the first and second rolled-on surface elements are rotatable relative to each other. A first one of the rolling elements includes a first sensor module having a sensor interface operably connected to a communication interface of a first communication module, and a second one of the rolling elements includes a second sensor module having the sensor interface operably connected to the communication interface of a second communication module. The common sensor interfaces allow different sensors to be used with identical communication modules.

12 Claims, 2 Drawing Sheets

(56) References Cited

U.S. PATENT DOCUMENTS

| | | | | |
|---|---|---|---|---|
| 2011/0182536 A1* | 7/2011 | Matsuda | ............... | F16C 19/522 |
| | | | | 384/448 |
| 2017/0241865 A1* | 8/2017 | Jakobsen | ............... | F16C 19/364 |
| 2018/0003492 A1* | 1/2018 | van der Ham | .......... | F16C 33/34 |

* cited by examiner

ROLLING-ELEMENT BEARING ASSEMBLY

CROSS-REFERENCE

This application claims priority to German patent application no. 10 2017 208 871.0 filed on May 24, 2017, the contents of which are fully incorporated herein by reference.

TECHNOLOGICAL FIELD

The disclosure is directed to a rolling-element bearing assembly.

BACKGROUND

Some proposals for sensorized rolling-element bearing assemblies are already known from the prior art that are configured as very specific fitting solutions.

SUMMARY

An aspect of the disclosure is to provide an improvement in this respect.

A rolling-element bearing assembly according to the disclosure includes the following features:

at least one first and second rolled-on surface element, on which rolling elements are provided for rolling, at least one set of rolling elements, which is disposed between the first and second rolled-on surface element such that the rolled-on surface elements are rotatable with respect to each other in the manner of a rolling-element bearing, at least one first of the rolling elements comprises a first sensor module and a first communication module to which the first sensor module is connected, at least one second of the rolling elements comprises a second sensor module and a second communication module to which the second sensor module is connected, and the communication modules and the sensor modules are formed with a uniform connection interface for connecting the modules.

The uniformity or standardization of the connection interfaces allows the use of a uniform communication module independent of the configuration of the sensor module, which depending on the type of variables to be detected must systemically be configured differently for different variables. The uniformity of the communication modules facilitates the connection to a common receiver, and the use of identical subassemblies offers many advantages with respect to provision but also cost advantages. An adapting to the most diverse use cases is also possible in a simple and cost-effective manner. The same applies for retrofitting and replacement.

Furthermore since a plurality of rolling elements are equipped with sensors, the space problem that exists if they were all to be packed in a single rolling element is solved. Furthermore variables are thereby detectable that would not be detectable this way at all using a single sensorized rolling element. Here the rolling elements are in particular disposed distributed in specific positions with respect to one another, for example, two disposed exactly opposite each other, or three respectively at 120° spacing, or four respectively at 90° spacing. Of course solely sensorized rolling elements can also be used.

Further advantages, features and details of the disclosure arise from the exemplary embodiments of the disclosure described in the following with the assistance of the Figures.

DETAILED DESCRIPTION

Figure 1:
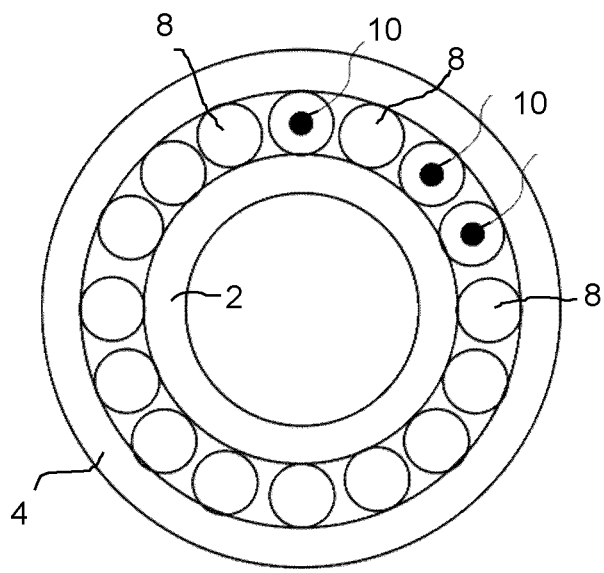
FIG. 1 is a cross-section through a rolling-element bearing assembly.

FIG. 1 shows a cross-section through a rolling-element bearing assembly configured as a cylindrical roller bearing. The rolling-element bearing assembly here comprises an inner rolled-on surface element 2 configured hollow-cylinder-shaped and an outer rolled-on surface element 4 also configured hollow-cylinder-shaped, between which a set of cylindrical rolling elements 8 and 10 is disposed such that the two rolled-on surface elements 2 and 4 are rotatable or at least pivotable against each other in the manner of a rolling-element bearing.

Here normal, conventional rolling elements 8 without sensor technology and rolling elements 10 including sensor technology are present. The sensor technology is disposed in the cavities of the hollow-cylindrically configured rolling element 10, or in another embodiment is disposed in not-axially-continuous cavities extending outward from the end sides of the cylindrical rolling element. Here the sensor technology comprises one or more sensors for variables such as are described in more detail, for example, with respect to FIG. 4. Here the sensor technology of different rolling elements 10 can be configured for detecting the same or also different variables, for example, revolutions of rolling elements 10 and the rolling-element bearing assembly, load, and/or acoustic emissions. In some embodiments the sensorized rolling elements 10 can be distributed in specific positions with respect to one another, for example, two disposed exactly opposite each other, or three respectively at 120° spacing, or four respectively at 90° spacing, or solely sensorized rolling elements 10 can also be used.

Furthermore in one embodiment a cage is present in which the rolling elements 8 and 10 are disposed and which prevents, for example, a mutual contacting of the rolling elements 8 and 10. Seals can likewise be provided that seal the rolling-element space outward so that, for example, a lubricant, e.g., grease or oil, present in the rolling-element space does not penetrate outward. The rolled-on surface elements 2 and 4 as well as the rolling elements 8 and 10 can be manufactured from a rolling-element bearing steel or also any other suitable material.

Figure 2:
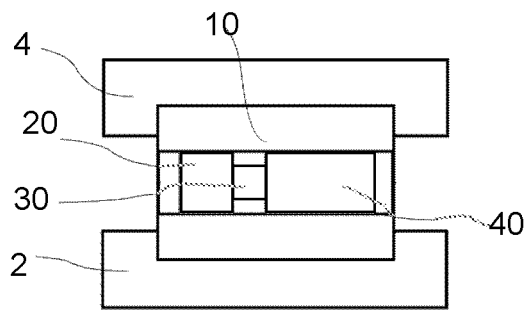
FIG. 2 is a longitudinal section through the rolling-element bearing assembly of FIG. 1 in the region of a rolling element including a sensor.

FIG. 2 shows a longitudinal section through the rolling-element bearing assembly of FIG. 1 in the region of one of the sensorized rolling elements 10. Here it can be seen that the sensor technology is disposed in the cavity of the hollow-cylindrical rolling element 10. The sensor technology here comprises a sensor module 20 that is connected to a communication module 40 via a connection interface 30. Here the sensor technology of the other rolling elements 10 provided with sensors is correspondingly constructed, wherein with particular advantage an identically constructed communication module is used for all sensor technologies and the connection interface 30 is also a uniform one, with the result that the sensor technologies differ only in their sensor module 20 depending on the type and role of the variables to be detected.

Figure 3:
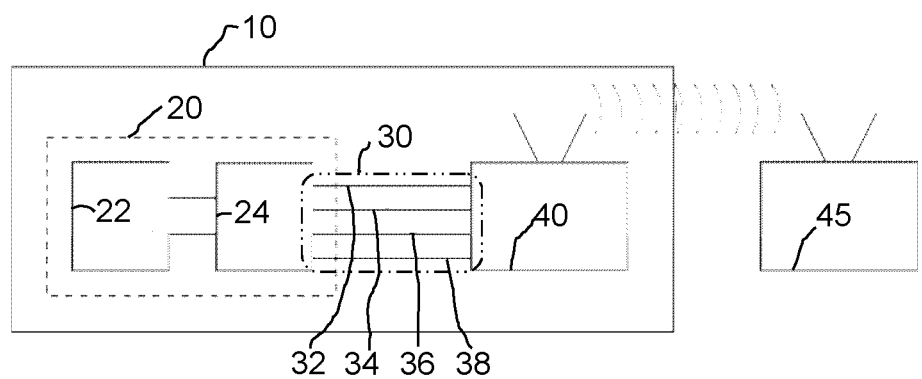
FIG. 3 is a detail-explaining sketch of a sensorized rolling element and of a receiver.

FIG. 3 shows a detail-explaining schematic sketch of the rolling element 10 of FIG. 2 provided with sensor technology in connection with a receiver 45 disposed outside the actual rolling-element bearing assembly. Here the uniform connection interface 30 comprises four connecting points 32, 34, 36, and 38 and specifically one for the electrical energy supply, a further one for analog data transmissions, a further one for digital data transmissions, and a final one for ground. Furthermore the communication module is configured for wireless data transfer to the receiver 45. Here the sensor module 20 can in itself be formed subdivided again from the actual sensor 22 and a corresponding amplifier 24.

By combining the measured data in particular of a plurality of sensorized rolling elements 10 taking into account their temporal progression and occurrence, an all-encompassing determination, for example, of load states of the rolling-element bearing assembly is advantageously made possible. For this purpose in one embodiment the sensorized rolling elements 10 are given a precise time stamp, which can be realized, for example, by a time synchronization with the receiver 45 via the wireless data connection.

Figure 4:
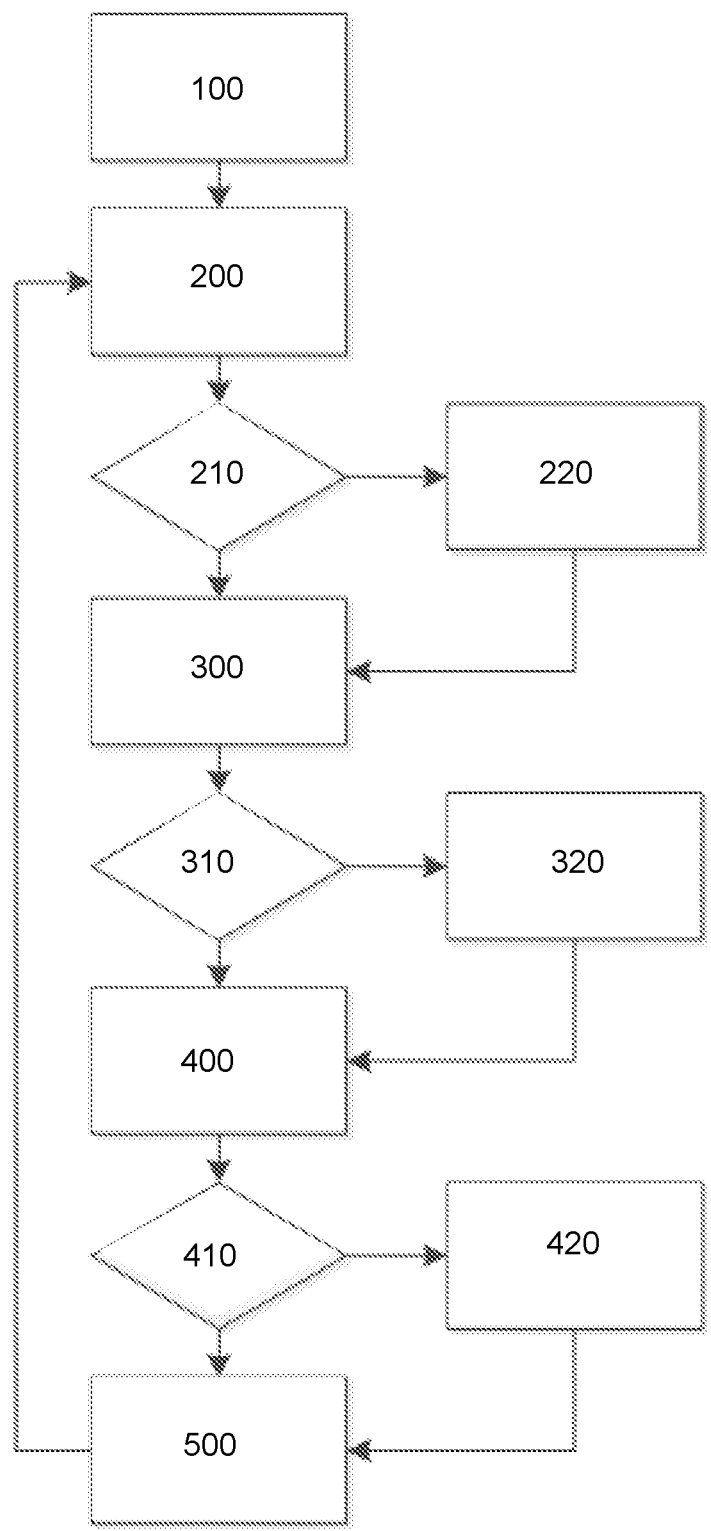
FIG. 4 is a flow diagram of a measurement and evaluation method for a rolling-element bearing assembly including sensorized rolling elements.

FIG. 4 shows as one exemplary embodiment of the disclosure a flow diagram of a method for monitoring and controlling the operation of a rolling-element bearing assembly, wherein according to the above-described configurations at least two or more of the rolling elements are equipped with a sensor for detecting noise emissions, with a load sensor, and/or with a sensor for detecting the bearing- and rolling-element-rotation.

In a specification step 100 of the method the threshold values for the noise emissions, the load, and the rolling-element slip are defined, which threshold values differ depending on the type of the rolling-element bearing assembly and the application. Thereafter in a first step 200 of the method the noise emission of the rolling-element bearing assembly is detected by the corresponding sensor and transmitted to a receiver unit. In the receiver unit the measured and transmitted data of the noise emission is then compared, at decision diamond 210, to the defined threshold value for the noise emission, so that with a falling-below of the threshold value the next step 300 is continued, or in the case of the exceeding of the threshold value the step 220 is continued before the method continues thereafter with step 300 as required.

Here step 220 includes a corresponding notifying of the operator of the rolling-element bearing assembly and/or the process parameters influencing or controlling the operation of the rolling-element bearing assembly are changed such that it can be concluded therefrom that the noise emission has thus dropped below the defined threshold value. In severe cases an emergency shutdown can also be initiated, whereby the method is ended and the system would be restarted again.

In step 300 of the method the load situation of the rolling-element bearing assembly is then detected by the corresponding sensor and transmitted to the receiver unit. In the receiver unit the measured and transmitted load situation is then compared, at decision diamond 310, to the defined threshold value for the load, so that with a falling-below of the threshold value the next step 400 is continued, or in the case of exceeding the threshold value the step 320 is continued before the method continues thereafter with step 400 as required. Here step 320 in turn includes a corresponding notifying of the operator of the rolling-element bearing assembly that the process parameters influencing or controlling the operation of the rolling-element bearing assembly have changed such that it can be concluded therefrom that the load has thus dropped below the defined threshold value. In severe cases can an emergency shutdown can also in turn be considered. In severe cases an emergency shutdown can also in turn be initiated, whereby the method is ended and the system would be restarted again.

In step 400 of the method the bearing and rolling-element rotation is then determined by the corresponding sensor for the determining of a possibly existing bearing slip and transmitted to the receiver unit. In the receiver unit it is then compared, at decision diamond 410, to the defined threshold value for the slip, so that with a falling-below of the threshold value the next step 500 is continued, or in the case of the exceeding of the threshold value the step 420 is continued before the method continues thereafter with step 500 as required. Here step 420 in turn includes a corresponding notifying of the operator of the rolling-element bearing assembly that the process parameters influencing or controlling the operation of the rolling-element bearing assembly have changed such that it can be concluded therefrom that the slip has thus dropped below the defined threshold value. In severe cases an emergency shutdown can also in turn be initiated, whereby the method is ended and the system would be restarted again.

Finally in step 500 a general status report of the rolling-element bearing assembly including the measured data is generated before the method is then carried out again with step 100, etc. . . . . .

The method course described above here only represents a single exemplary embodiment. Depending on more or fewer sensors as well as depending on sensors for detecting other variables, the flow diagram depicted in FIG. 4 shortens or lengthens accordingly and/or handles said other variables. Vibration in particular but also the lubrication quality or the skewing of rolling elements as well as temperature come into consideration as other variables. Furthermore in one embodiment at least one accelerometer can also be provided, which can also be used, for example, to detect a change of the vibrations if the lubricating conditions change.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing assembly comprising:
a first rolled-on surface element;
a second rolled-on surface element; and
a plurality of rolling elements arranged between the first and second rolled-on surface elements such that the first and second rolled-on surface elements are rotatable relative to each other,
wherein a first one of the rolling elements comprises a first sensor module having a first sensor interface operably connected to a first communication interface of a first communication module, and
wherein a second one of the rolling elements comprises a second sensor module having a second sensor interface operably connected to a second communication interface of a second communication module,
wherein each of the first and second sensor interfaces comprise an electrical energy supply connecting point, an analog data transmission connecting point, a digital data transmission connecting point, and a ground connecting point.

2. The rolling-element bearing assembly according to claim 1, wherein the first and second sensor modules are identical.

3. The rolling-element bearing assembly according to claim 1, wherein the first one of the plurality of rolling elements and the second one of the plurality of rolling elements are disposed in the plurality of rolling elements such that they are mutually angularly spaced by a given amount.

4. The rolling-element bearing assembly according to claim 1, wherein the rolling elements are disposed in a cage, and the cage is configured to allow communication from the first communication module to a receiver.

5. The rolling-element bearing assembly according to claim 1, wherein the plurality of rolling elements are rollers, and wherein the first sensor module and the first communication module are disposed in a cavity that extends into an interior of the roller from an axial end of the first roller.

6. The rolling-element bearing assembly according to claim 1, wherein the first sensor module comprises at least one sensor selected from the group consisting of: a noise emission sensor, a load sensor, a rolling-element rotation sensor, a temperature sensor, an acceleration sensor, and a lubrication parameter sensor.

7. A system comprising:
the rolling-element bearing assembly according to claim 1, and
a control and monitoring unit configured to monitor and control an operating state of the rolling-element bearing assembly, the control and monitoring unit being configured to receive and process outputs from the first sensor module transmitted by the first communication module and outputs from the second sensor module transmitted by the second communication module and to determine whether the output from the first sensor module or the output from the second sensor module indicates an abnormal operating condition.

8. The rolling-element bearing assembly according to claim 1, wherein the first communication module or the second communication module is a wireless communication module.

9. The rolling-element bearing assembly according to claim 1,
wherein the first and second sensor modules are identical,
wherein the first one of the plurality of rolling elements and the second one of the plurality of rolling elements are disposed in the plurality of rolling elements such that they are mutually angularly spaced by a given amount,
wherein the rolling elements are disposed in a cage, and the cage is configured to allow communication from the first communication module to a receiver,
wherein the plurality of rolling elements are rollers, and wherein the first sensor module and the first communication module are disposed in a cavity that extends into an interior of the roller from an axial end of the first roller, and
wherein the first sensor module comprises at least one sensor comprising a noise emission sensor, a load sensor, a rolling-element rotation sensor, a temperature sensor, an acceleration sensor, or a lubrication parameter sensor.

10. The rolling-element bearing assembly according to claim 1, wherein the first and second sensor modules are different.

11. The rolling-element bearing assembly according to claim 1, wherein the first sensor module and the second sensor module are each selected from the group consisting of: a noise emission sensor, a load sensor, a rolling-element rotation sensor, a temperature sensor, an acceleration sensor, and a lubrication parameter sensor and where the first sensor is configured to sense a different condition than the second sensor.

12. The rolling-element bearing assembly according to claim 9, wherein the first sensor module and the second sensor module are each selected from the group consisting of: a noise emission sensor, a load sensor, a rolling-element rotation sensor, a temperature sensor, an acceleration sensor, and a lubrication parameter sensor and where the first sensor is configured to sense a different condition than the second sensor.

* * * * *